United States Patent [19]

Kojima et al.

[11] Patent Number: 5,201,228
[45] Date of Patent: Apr. 13, 1993

[54] PRESSURE SENSOR

[75] Inventors: Takao Kojima; Kanehisa Kitsukawa; Toshikatsu Yasuda; Katsuyoshi Mizumoto, all of Aichi, Japan

[73] Assignee: NGK Spark Plug Co., Ltd., Aichi, Japan

[21] Appl. No.: 748,883

[22] Filed: Aug. 23, 1991

[30] Foreign Application Priority Data

Aug. 28, 1990 [JP] Japan ................................. 2-227410

[51] Int. Cl.$^5$ ........................... G01L 7/08; G01L 9/12
[52] U.S. Cl. ..................................... 73/724; 29/25.41; 73/718; 361/283
[58] Field of Search ..................... 73/718, 706, 708; 29/25.01, 25.41; 361/283

[56] References Cited

U.S. PATENT DOCUMENTS

| | | | |
|---|---|---|---|
| 3,750,476 | 8/1973 | Brown | 361/283 |
| 3,993,939 | 11/1976 | Slavin et al. | 361/283 |
| 4,184,189 | 1/1980 | Davis et al. | 361/283 |

FOREIGN PATENT DOCUMENTS 63-292032 11/1988 Japan.

Primary Examiner—Donald O. Woodiel
Attorney, Agent, or Firm—Finnegan, Henderson, Farabow, Garrett & Dunner

[57] ABSTRACT

A pressure sensor including at least two ceramic layers formed as elongated sheets and bonded together with a gap therebetween at one end so as to form a diaphragm of a portion of one of the ceramic layers that faces the gap and that receives on an outer surface thereof the pressure to be measured, a pressure-sensitive electrode portion from which an electric output corresponding with the pressure to be measured is generated on the basis of the amount of strain of the diaphragm that develops under the pressure to be measured, the pressure-sensitive electrode portion being provided on or around the diaphragm, and a plurality of conductor paths that are connected to the pressure-sensitive electrode portion and that extend along the length of the ceramic layers, the conductor paths having terminals at the other end of the bonded ceramic layers for connection to an external electric circuit. In another embodiment of the present invention, the pressure sensor includes a cylindrical ceramic layer, and a ceramic layer provided around the circumference of the cylindrical ceramic layer with a circumferential gap formed between the ceramic layer and the cylindrical ceramic layer at one end so as to form a diaphragm of a portion of the ceramic layer that faces the gap.

8 Claims, 7 Drawing Sheets

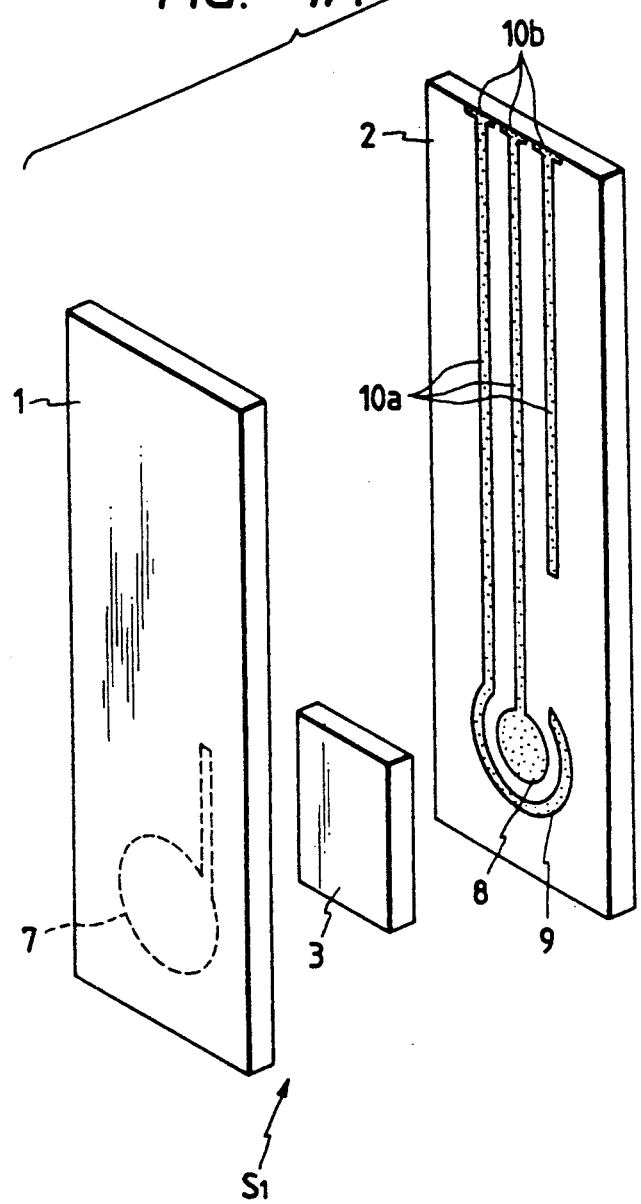
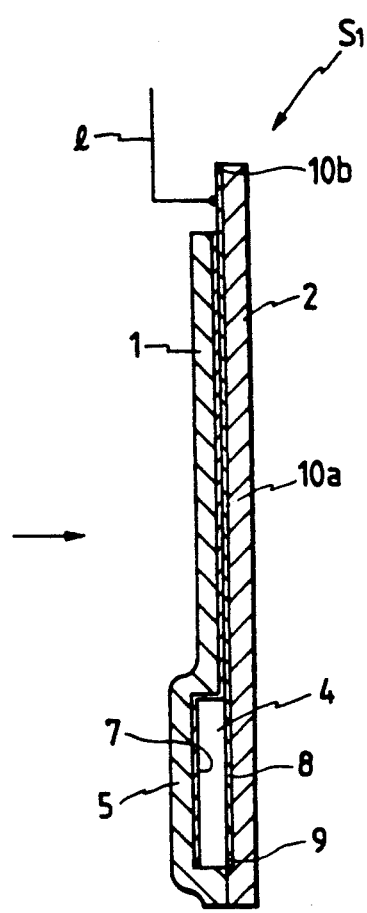
FIG. 1A
FIG. 1B

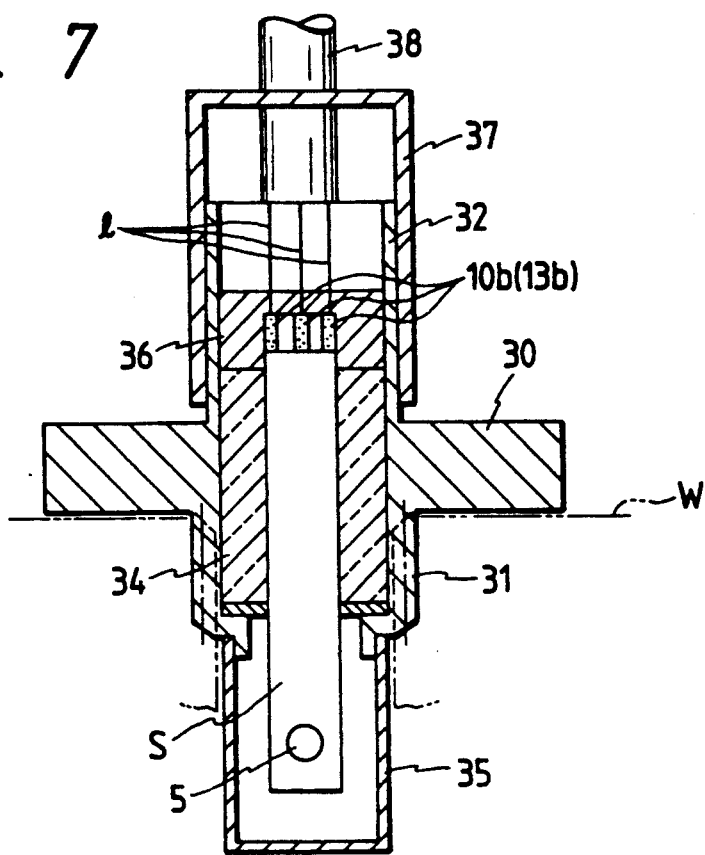
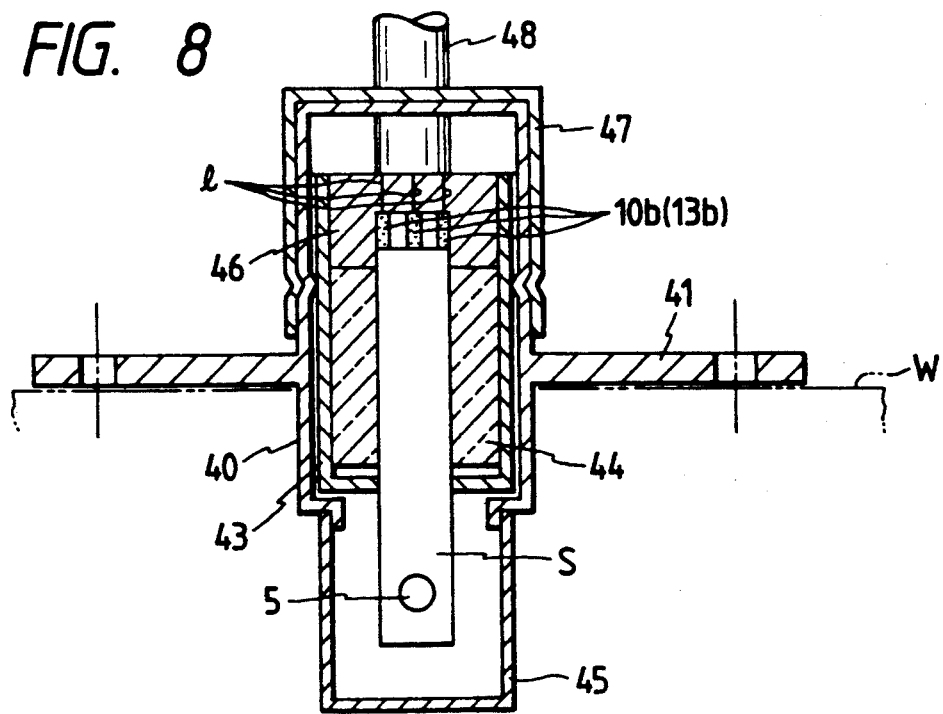

PRESSURE SENSOR

BACKGROUND OF THE INVENTION

1. Field of the Invention

The present invention relates to fluid pressure sensors. More particularly, the invention relates to a ceramic pressure sensor having a diaphragm to be distorted by pressure so that the pressure of interest can be measured on the basis of the resulting distortion of the diaphragm.

2. Discussion of the Related Art

A conventional pressure sensor, as described in Japanese Patent Unexamined Publication No. Sho. 63-292032, has a diaphragm which is distorted when the pressure to be measured is applied to one side of the diaphragm. The amount of the resulting distortion is measured with a Wheatstone bridge. As shown schematically in FIG. 10, the structure of such a pressure sensor includes a housing a having a threaded coupling portion b with an axial bore c open at its lower end to fluid pressure and an upper mounting counterbore d; a sintered ceramic member e having a diaphragm g on a support h, the diaphragm g being provided within the mounting counterbore d as an integral unit adjacent to a circular gap f that communicates with the fluid pressure introduced to the bore a lid j fitted over the housing a to form a reference pressure compartment k extending between the underside of the lid j and the diaphragm g; resistors i of a Wheatstone bridge formed on the diaphragm g within the pressure compartment k; lead wires m electrically connected to the resistors i; and a clamping member n that secures the lid j to the housing a.

In the pressure sensor having the construction described above, the gas under pressure to be measured is introduced into the circular gap f through the bore c. If the support h and the diaphragm q are exposed to different temperature conditions, the difference in temperature will result in a thermal expansion mismatch between the support h and the diaphragm causing the diaphragm g to distort. Such distortion in the diaphragm g can result in erroneous detection of fluid pressure changes which do not exist in fluid introduced to the bore c.

A further problem is created by the direct connection of the lead wires m to the diaphragm g to be distorted. Thus, the wire connections tend to break on account of extensive vibrations of the diaphragm g. In addition, the lead wires m exert a sufficient load to damp the distortion that would otherwise develop in the diaphragm g.

The pressure sensor shown in FIG. 10 has the additional problem in that the pressure compartment k must be sealed. Because the pressure compartment k is formed by the lid j which is a physically separate member from the housing a, creating and maintaining a sealed compartment can be difficult. If the seal is not sufficiently maintained, it is difficult to maintain a vacuum within the pressure compartment k, if such a vacuum is desired.

SUMMARY OF THE INVENTION

The present invention has been made in view of the above circumstances and has as an object the provision of a pressure sensor having a diaphragm and that is free from the aforementioned problems.

A further object of the present invention is to provide a pressure sensor wherein distortion of the diaphragm due to a thermal expansion mismatch resulting from the exposure of the sensor to varying temperature conditions, may be prevented. By providing a heater at a distal end of the sensor, the occurrence of a temperature difference that would otherwise cause a thermal expansion mismatch and distort the diaphragm, can be prevented, thus substantially reducing the chance of erroneous pressure detection.

Another object of the present invention is to provide a pressure sensor having conductor wires which are connected to the end of the sensor remote from the diaphragm, thus reducing the chance of mechanical failure caused by the distortion of the diaphragm. Further, by providing conductor wires at a remote end of the sensor, the diaphragm is not subjected to any load due to the wire connecting portions so that only the pressure to be measured is exerted on the diaphragm, thereby permitting the sensor to produce an output that corresponds only to the pressure of interest.

Still another object of the present invention is to provide a pressure sensor having a gap formed between the ceramic layer and the supporting ceramic layer provided with excellent sealing characteristics, causing no problems at elevated temperatures, and providing a reference pressure therein.

Yet another object of the present invention is to provide a pressure sensor having a pressure introducing groove, which, when sealed under a vacuum, provides a reference pressure in the gap, thus allowing the measurement of the absolute value of the applied external pressure.

To achieve the objects and in accordance with the purpose of the invention, as embodied and broadly described herein, the pressure sensor of this invention comprises at least two ceramic layers formed as elongated sheets and bonded together with a gap therebetween at one end so as to form a diaphragm in a portion of one of the ceramic layers that faces the gap and that receives on an outer surface thereof the pressure to be measured, a pressure-sensitive electrode portion from which an electric output corresponding with the pressure to be measured is generated on the basis of the amount of strain of the diaphragm developed by the pressure to be measured, the pressure-sensitive electrode portion being provided on or around the diaphragm, and a plurality of conductor paths connected to the pressure-sensitive electrode portion and extending along the length of the ceramic layers, the conductor paths having terminals at the other end of the bonded ceramic layers for connection to an external electric circuit.

In another embodiment of the present invention, the pressure sensor includes a cylindrical ceramic layer, and a ceramic layer provided around the circumference of the cylindrical ceramic layer with a circumferential gap formed between the ceramic layer and the cylindrical ceramic layer at one end so as to form a diaphragm in a portion of the ceramic layer that faces the gap.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings, FIG. 1A is an exploded perspective view showing unassembled components of a pressure sensor fabricated in accordance with a first embodiment of the present invention;

FIG. 1B is a cross-sectional view showing the pressure sensor shown in FIG. 1A after assembly;

FIGS. 7-9 are cross-sectional side views showing three examples of a mechanism used for mounting the pressure sensor of the present invention.

DETAILED DESCRIPTION OF THE PREFERRED EMBODIMENTS

Figure 2A:
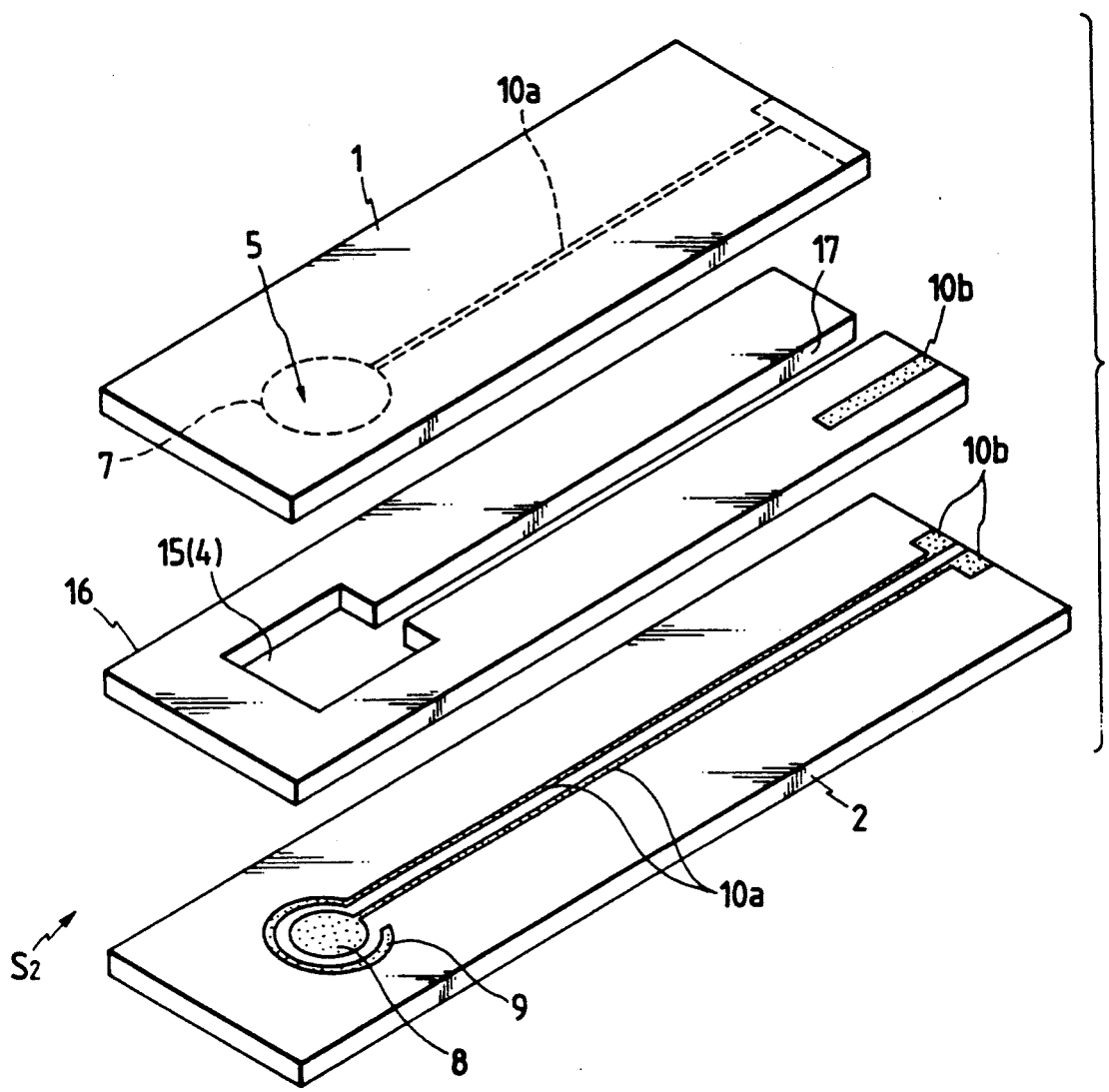
FIG. 2A is an exploded perspective view showing unassembled components of a pressure sensor fabricated in accordance with a second embodiment of the present invention.

In one embodiment of the present invention, a pressure-sensitive electrode portion including a first electrode formed on the inner surface of a diaphragm within a gap formed between the diaphragm and a ceramic layer, and a second electrode formed on the surface of the ceramic layer that faces the first electrode via the gap, whereby the two electrodes spaced apart by the gap effectively form a capacitor. When pressure is externally applied to the diaphragm, the diaphragm deforms and causes a change in the distance between the two electrodes, and thus, the pressure of interest may be measured on the basis of the resulting change in the electrostatic capacitance between the two electrodes.

Alternatively, the pressure-sensitive electrode portion may be a resistor assembly arranged to form a Wheatstone bridge, or the like, on either the outer or the inner surface of the diaphragm such that the resistance of the assembly will change in response to the distortion of the diaphragm.

The gap can be formed by various methods. In one method, the two ceramic layers are sintered together with a combustible material inserted therebetween so that the material may be burned away to leave a gap. In another method, the two ceramic layers are sintered together with a spacer formed of a ceramic sheet having an opening therein, the spacer being inserted between the two ceramic layers so that a gap is created by the opening in the spacer. According to yet another method, the two ceramic layers are so selected that they will shrink by different degrees upon sintering. The two ceramic layers are then sintered so that they are bonded together everywhere except within a non-bonding area provided in an end portion. A gap is created in the non-bonded area due to the difference in shrinkage between the two ceramic layers.

The pressure sensor is mounted such that the diaphragm is located within an atmosphere of a pressure to be measured. When the pressure of that atmosphere exceeds the pressure in the gap, the diaphragm distorts inward, and, as a result of this distortion, the output of the pressure-sensitive electrode portion which corresponds to the pressure to be measured will change. Hence, the above-described change in electrostatic capacitance or resistance can be read from the resulting change in the output from the pressure-sensitive electrode portion.

A first embodiment of the pressure sensor of the present invention is shown in FIGS. 1A and 1B and designated generally by the reference letter $S_1$. Ceramic layers 1 and 2 are formed as an elongated sheets made of $ZrO_2$, $Al_2O_3$, or other ceramic materials. The ceramic layer 1 on the pressure-receiving side has a thickness of 0.05–0.7 mm whereas the ceramic layer 2 on the support side has a thickness of 0.05–1.5 mm. Thus, the thickness of the pressure-receiving ceramic layer 1 is adjusted to be equal to or smaller than that of the supporting ceramic layer 2. As shown in FIG. 1A, a combustible material 3 such as carbon is provided in an end portion of the two unsintered or "green" ceramic layers 1 and 2. The three elements are bonded together as shown in FIG. 1B and, after heating at 300° C. for 20 hours to remove the resin, the elements are sintered at 1500° C. for 2 hours to form an integral assembly As will be described later in this specification, to provide a pressure-sensitive electrode portion of a capacitor type in the pressure sensor assembly, electrodes 7–9, conductor paths 10a, and conductive terminals 10b are preliminarily screen-printed or otherwise applied onto the inner surfaces of the ceramic layers 1 and 2 in selected positions where the combustible material 3 is held between the ceramic layers. Electrodes 7–9 may each be made of platinum, tungsten, molybdenum or some other suitable material.

As already mentioned, when the ceramic layers 1 and 2 are sintered, the combustible material 3 is burnt away to form the gap 4, and thus, the outer wall of the ceramic layer 1 which faces the gap 4 becomes a diaphragm 5 that will be distorted toward the gap 4 under an externally applied pressure A pressure-sensitive electrode portion is provided on or around the diaphragm 5. In response to the amount of distortion that occurs in the diaphragm 5 under the pressure to be measured, the pressure-sensitive electrode portion will generate an output that corresponds to the applied pressure. An example of this pressure-sensitive electrode portion is described below with reference to the electrostatic capacitive type.

Figure 5:
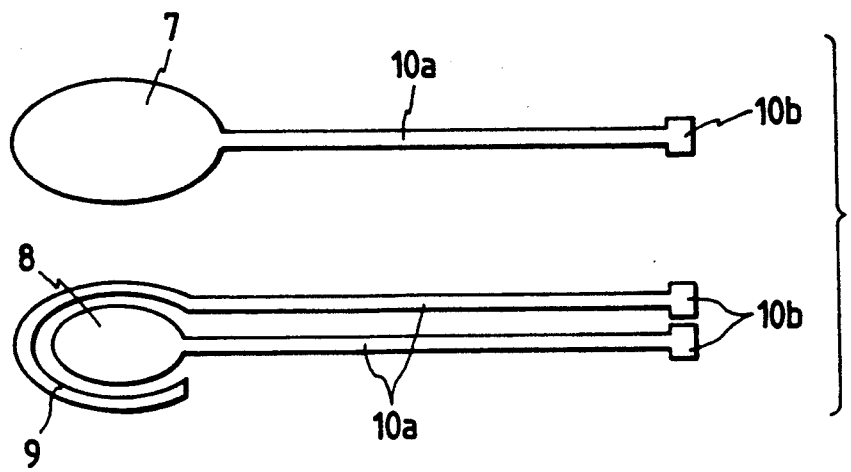
FIG. 5 is a diagram showing schematically an electrostatic capacitor type pressure-sensitive electrode portion.

As shown in FIG. 5, a circular movable electrode 7 is formed on the inner surface of the ceramic layer 1 which faces the gap 4. A circular detecting electrode 8 facing the movable electrode 7 and a reference electrode 9 concentrically surrounding the detecting electrode 8 are formed on the inner surface of the supporting ceramic layer 2 which also faces the gap 4. The conductor paths 10a may be made of platinum, tungsten, molybdenum or some other suitable material, and are connected to the movable electrode 7, detecting electrode 8, and reference electrode 9, such that they extend on the mating inner surfaces of the ceramic layer 1 and the supporting ceramic layer 2 without interfering with one another. By adjusting the length of the ceramic layer 1 to be a little shorter than that of the supporting ceramic layer 2, the supporting ceramic layer 2 projects beyond the ceramic layer 1 at the end opposite the gap 4 so that the conductive terminal 10b of each conductor path 10a will be exposed at the projecting portion. A conductor wire 1 is connected to each conductive terminal 10b. The conductor path 10a is preliminarily formed on the supporting ceramic layer 2 so that the conductor path 10a will be electrically connected to the movable electrode 7 when the ceramic layers 1 and 2 are bonded together. If the wire connecting portions are sealed with a silicone or some other suitable resin, they can be rendered sufficiently durable to withstand repeated vibrations and other external forces.

In the pressure-sensitive electrode portion having the configuration described above, the movable electrode 7 forms a capacitor with the detecting electrode 8 and the reference electrode 9. Each of these capacitors has an electrostatic capacitance inversely proportional to the distance between the associated electrodes.

When the pressure sensor $S_1$, constructed in the manner described above, is mounted with its lower end portion exposed to an atmosphere of a pressure to be measured while the upper end is retained (see FIG. 1B), the applied pressure causes the diaphragm 5 to be depressed towards the gap 4. When the diaphragm 5 is depressed towards the gap 4, the movable electrode 7 approaches the detecting electrode 8. As a consequence, the distance between the two electrodes decreases and the electrostatic capacitance measured at the conductive terminals 10b is increased.

On the other hand, the reference electrode 9 faces the area surrounding the movable electrode 7, and does not distort even when the pressure to be measured is exerted. Hence, the distance between the electrodes 7 and 9 will remain the same, even if the diaphragm 5 is depressed in the manner described above. Thus, the electrostatic capacitance remains unchanged. By using this invariable electrostatic capacitance between the electrodes 7 and 9 as a reference, the amount of variation in the electrostatic capacitance between the electrodes 7 and 8 can be measured to enable the measurement of the applied pressure.

The reference electrode 9 is also useful for temperature compensation to eliminate errors generated by temperature variation of the pressure sensor $S_1$. That is, when the pressure sensor $S_1$ is used for measurement of an exhaust gas pressure of an internal combustion engine, the diaphragm 5 of the pressure sensor $S_1$ is subjected to high temperature or wide range temperature variation, so that the gap between the detecting electrode 8 and the movable electrode 7 varies due to the thermal expansion thereof to cause the error. However, since the gap between the reference electrode 9 and the movable electrode 7 is also varied due to temperature variation comparable to that of the detecting electrode 8, the error due to the temperature variation is removed and only an electric signal based on pressure can be obtained.

Figure 6:
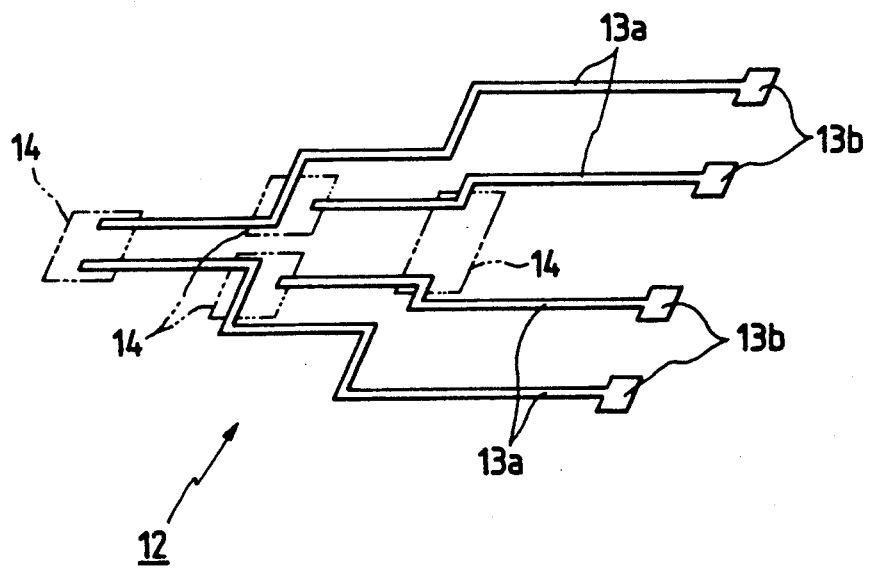
FIG. 6 is a diagram showing schematically a resistor type pressure-sensitive electrode portion.

Another example of the pressure-sensitive electrode portion is shown in FIG. 6 wherein a resistor assembly 12 is a Wheatstone bridge or some other circuit, formed on the diaphragm 5. When the resistor assembly 12 is distorted with the diaphragm 5, the resistor assembly produces a bridge imbalance corresponding to the amount of the distortion. Hence, one can evaluate the pressure applied to the diaphragm 5 by detecting the resulting change in resistance.

In the construction described above, the resistor assembly 12 is formed on the outer surface of the diaphragm 5. To this end, conductor paths 13a preliminarily formed on the surface of the ceramic layer 1 are sintered with the ceramic layer 1 and the supporting ceramic layer 2. The conductor paths 13a may be formed of platinum, tungsten, molybdenum or some other suitable metal. After sintering, a semiconductor 14 acting as a piezoelectric resistor is formed by coating a semiconductor material in selected areas of the resistor assembly 12, and is baked. With this construction, each of the conductor paths 13a has a conductive terminal 13b exposed at the upper end to permit electrical connection to an external circuit. If desired, the resistor assembly 12 may be provided on the inner surface of the diaphragm 5. When the resistor assembly 12 is provided on the outer surface of the diaphragm 5, a dielectric protective layer may be formed over the surface of the resistor assembly 12.

Another possible example of the pressure-sensitive electrode portion is a combination of the electrostatic capacitor type shown in FIGS. 1A and 1B with the resistor assembly 12 provided on the outer surface of the diaphragm 5. An advantage of this embodiment is that either the electrostatic capacitor type or the strain resistor type can be selected depending upon the operating conditions or the type of equipment with which the pressure sensor is to be used.

Another method of forming a gap 4 in a pressure sensor $S_2$ as shown in FIG. 2A, comprises inserting a ceramic spacer 16 between the ceramic layers 1 and 2, wherein the ceramic spacer 16 has an opening 15 and is made of the same material as the ceramic layers 1 and 2. If the three elements are bonded together and sintered en masse, the gap 4 is formed by the opening 15 as shown in FIG. 2B, and the portion of the ceramic layer 1 facing the opening 15 serves as the diaphragm 5.

Figure 2B:
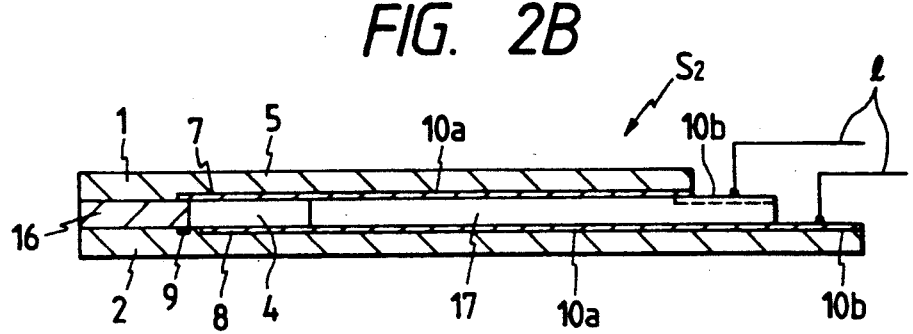
FIG. 2B is a cross-sectional view showing the pressure sensor shown in FIG. 2A after assembly.

In the embodiment shown in FIGS. 2A and 2B, a conductor path 10a for the movable electrode 7 is formed on the inner surface of the ceramic layer 1 whereas a conductive terminal 10b for the conductor path 10a is formed on the ceramic spacer 16. By bonding the ceramic layer 1 to the ceramic spacer 16, the conductor path 10a and the conductive terminal 10b are electrically connected. A conductor wire 1 is also connected to the conductive terminal 10b on the ceramic spacer 16.

The pressure sensor of the present invention is also adapted to detect the absolute value of the pressure of interest by using the pressure in the gap 4 as a reference. To control the pressure in the gap 4, a pressure introducing groove 17 providing access to the opening 15 is formed in the ceramic spacer 16, and by sintering the necessary elements as an integral assembly, a hole providing access to the gap 4 is formed. A known pressure such as vacuum is created within the gap 4 via the hole and is used as a reference value for measuring the absolute value of the applied pressure.

According to still another method of forming the gap 4, the ceramic layer 1 and the supporting ceramic layer 2 are so selected that they will shrink by different degrees upon sintering. The ceramic layers 1 and 2 are bonded together either by thermocompression or by applying an appropriate adhesive such as ceramic paste, in all areas between the ceramic layers 1 and 2 except in a non-bonding area where the diaphragm 5 is to be formed. By subsequently sintering the assembly, the difference in the amount of shrinkage that occurs between the ceramic layer 1 and the supporting ceramic layer 2 is so great in the non-bonded area that a gap 4 is created in that area.

Figure 3:
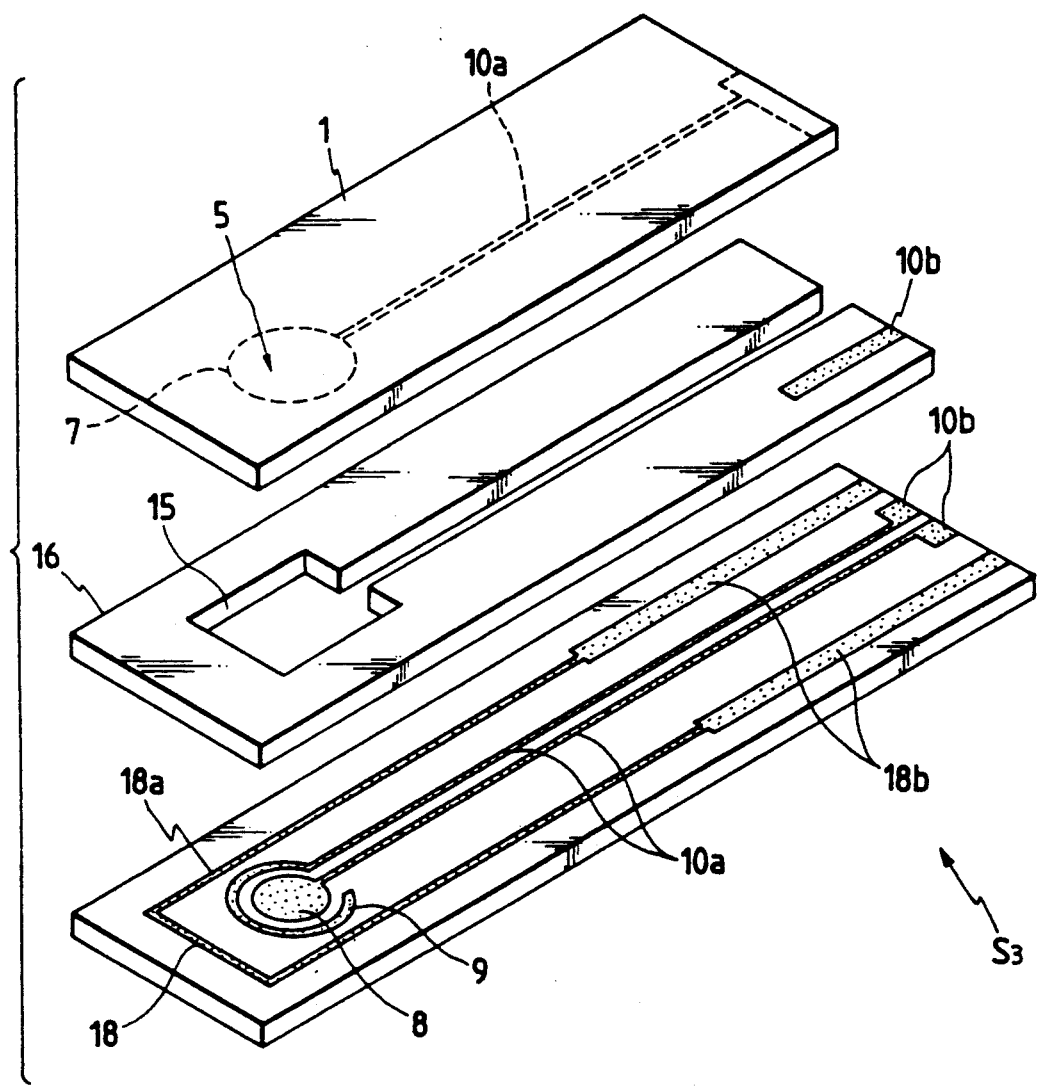
FIG. 3 is an exploded perspective view showing unassembled components of a pressure sensor fabricated in accordance with a third embodiment of the present invention.

The pressure sensor may also be adapted to permit preliminary heating to a given temperature for the purpose of preventing the occurrence of characteristic variations caused by the temperature conditions under which the pressure sensor is subjected. An embodiment having a construction that achieves this object is shown in FIG. 3. The pressure sensor according to this embodiment is generally designated by the reference letter $S_3$ and includes a heater 18 screen-printed or otherwise coated on the supporting ceramic layer 2 around the detecting electrode 8 and the reference electrode 9. The ceramic spacer 16 having an opening 15, is provided over the heater 18, and the ceramic layer 1 is provided over the spacer 16. The respective elements are bonded together and sintered to create the gap 4 within the opening 15. The heater 18 comprises a heat-generating resistor 18a made of molybdenum, platinum or some other suitable metal and positioned around the opening 15. By applying a voltage between power lines 18b, the resistor 18a generates heat which raises the temperature around the diaphragm 5 of the pressure sensor $S_3$ to a predetermined level.

In the construction described above, the temperature uniformly distributed around the diaphragm 5 so that thermal distortion due to temperature differences will not develop in the diaphragm 5. Thus, the only distortion of the diaphragm 5 that is capable of being detected is that caused by the pressure to be measured, thereby allowing accurate pressure measurement.

The constructions described on the foregoing pages all relate to a pressure sensor formed as a sheet in which the diaphragm 5 is formed on only one surface of the sheet. Using this type of pressure sensor, the dynamic pressure of a fluid can easily be measured by positioning the diaphragm 5 in a counter-current fashion with respect to the fluid flow.

Figure 4A:
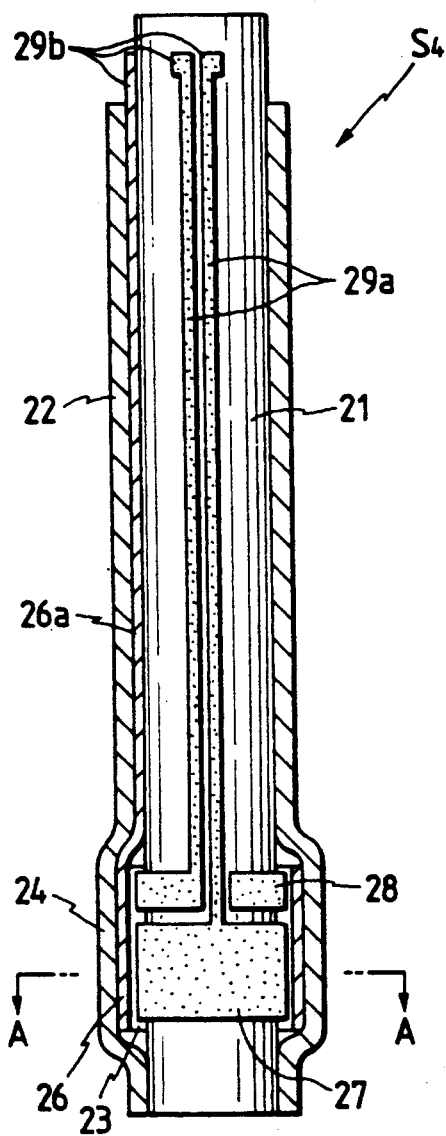
FIG. 4A is a cross-sectional side view showing a cylindrical pressure sensor according to a fourth embodiment of the present invention.
Figure 4B:
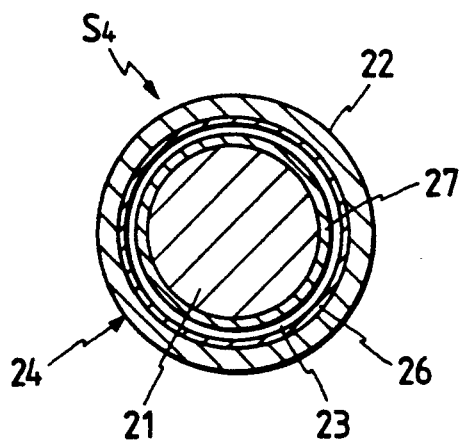
FIG. 4B is a cross-sectional view of the cylindrical pressure sensor taken along line A—A of FIG. 4A.

The pressure sensor of the present invention can also be configured in a cylindrical shape as represented by the embodiment shown in FIGS. 4A and 4B, and generally designated by the reference letter $S_4$. The pressure sensor $S_4$ includes a solid cylindrical ceramic layer 21 provided with a ceramic layer 22 around its circumference, and a circumferential gap 23 formed between the ceramic layers 21 and 22 in the lower portion, wherein the outer wall of the ceramic layer 22 facing the gap 23 serves as a diaphragm 24. A pressure-sensitive electrode portion is formed around the diaphragm 24. The pressure-sensitive electrode of the pressure sensor $S_4$ shown in FIGS. 4A and B is that of an electrostatic capacitor type, wherein a movable electrode 26 is formed on the inner circumference of the diaphragm 24, a detecting electrode 27 is formed on the major surface of the ceramic layer 21 facing the diaphragm 24 with the gap 23 interposed, and a narrow reference electrode 28 is formed above the detecting electrode 27. A conductor path 29a for each of the electrodes 26, 27 and 28 is provided between the ceramic layers 21 and 22 and extends upward to provide a connecting terminal 29b exposed at the upper end and situated on the surface of the ceramic layer 21. Conductor wires are connected to those connecting terminals 29b so that the output of the pressure-sensitive electrode portion may be connected to an external electric circuit.

The pressure sensor $S_4$ having the construction described above may be fabricated by the following procedure. First, the detecting electrode 27, reference electrode 28 and conductor paths 29a are formed by coating on the surface of the ceramic layer 21 which is preliminarily shaped in a solid cylindrical form. The movable electrode 26 is formed on the inner surface of the ceramic layer 22 which is formed as a sheet in a position where the diaphragm 24 is to be formed. The ceramic layers 21 and 22 are bonded together, with the layer 22 being wound onto the surface of the layer 21 with a combustible material such as carbon, inserted between the two ceramic layers in a position where the gap 23 is to be formed. To establish a connection to the connecting terminals 29b positioned on the surface of the ceramic layer 22, connecting branches 26a are formed as an integral part of the movable electrode 26. The individual elements are sintered together, whereupon the combustible material is burned away to form the gap 23.

In this construction, the movable electrode 26 forms capacitors with the detecting electrode 27 and the reference electrode 28. When the pressure sensor $S_4$ having this construction is mounted such that the lower end portion 3 is exposed to an atmosphere of a pressure to be measured, the pressure is exerted from around the diaphragm 24 which causes the diaphragm to be depressed inward and the movable electrode 26 to approach the detecting electrode 27. As a consequence, the distance between the movable electrode 26 and the detecting electrode 27 decreases and the electrostatic capacitance therebetween increases. On the other hand, the reference electrode 28 facing the edge portions of the movable electrode 26 is less prone to be influenced by the distortion of the diaphragm 24. Hence, the distance between the movable electrode 26 and the reference electrode 28 remains the same to keep the electrostatic capacitance therebetween unchanged. By using this invariable electrostatic capacitance between the electrodes 26 and 28 as a reference, the amount of variation in the electrostatic capacitance between the electrodes 26 and 27 can be measured to enable the pressure to be accurately measured.

The reference electrode 28 is also useful for temperature compensation like the above-mentioned reference electrode 9 of the pressure sensor $S_1$.

As in the case where the pressure sensor is formed as a sheet, the gap 23 in the cylindrical pressure sensor $S_4$ can be formed by other methods including the use of a spacer having an opening or the use of ceramic layers 21 and 22 that are so selected as to shrink by different degrees upon sintering. Further, a heater may also be applied in the same manner as described in connection with the pressure sensor in sheet form.

A resistor assembly comprising a Wheatstone bridge or some other suitable circuit may be provided on either the inner or outer surface of the diaphragm 24. It is also possible to provide a bridge circuit of resistors on the outer surface of the diaphragm 24 in combination with the electrostatic capacitor type configuration shown in FIG. 5 so as to permit the user to select between the two types of pressure-sensitive electrode portions.

The ceramic layer 22 may be formed by coating a ceramic paste on the circumference of the ceramic layer 21. In another embodiment, a bore (not shown) that provides access to the gap 23 may be provided through the longitudinal axis of the solid cylindrical ceramic layer 21. The gap 23 may then be evacuated through the bore so as to create a vacuum in the gap 23, thereby enabling the absolute value of the pressure of interest to be measured.

In the cylindrical pressure sensor $S_4$ described above, the diaphragm 24 is formed around its circumference so that the sensor is capable of detecting pressure in all directions. Hence, this type of pressure sensor is particularly useful for detecting pressures in a static environment.

Figure 9:
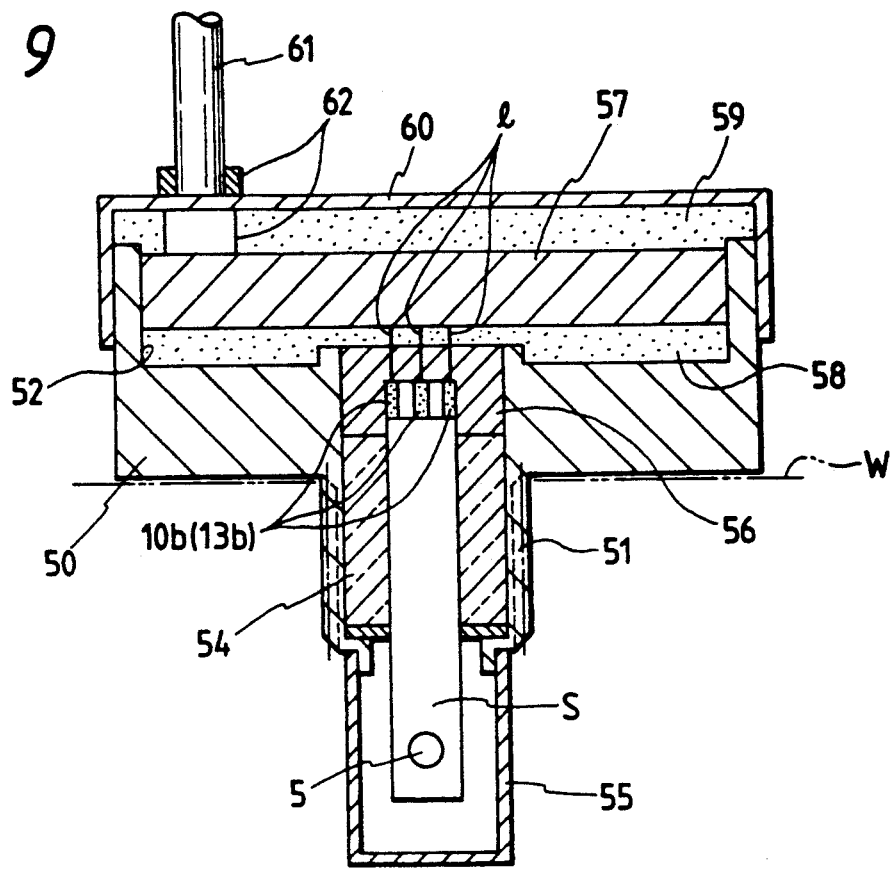
Figure 10:
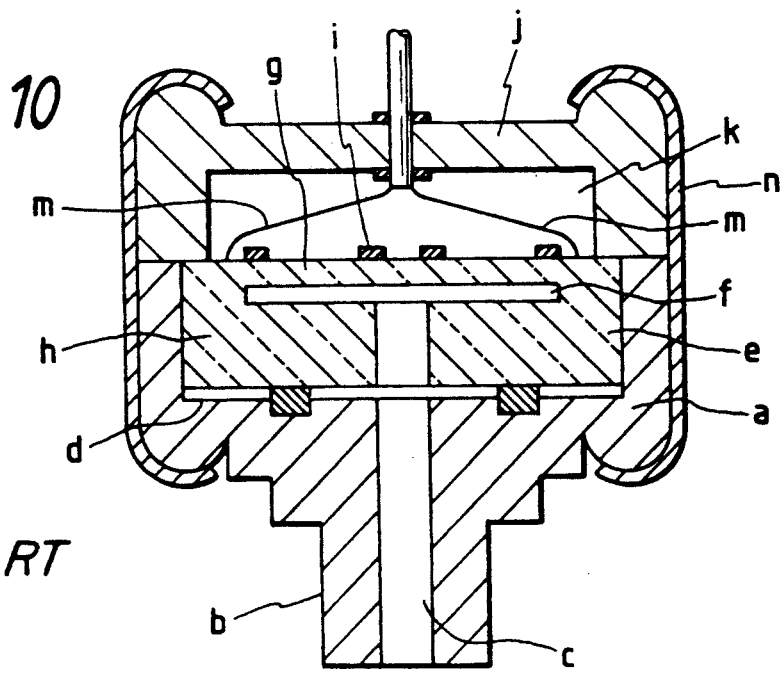
FIG. 10 is a cross-sectional side view showing a conventional pressure sensor.

FIGS. 7-9 show three arrangements for utilizing the sheet-type pressure sensor for practical applications.

In the arrangement shown in FIG. 7, a pressure sensor S is inserted through a threaded pipe 30 with a hexagonal head that has a male thread 31 by which the pipe 30 is threaded into the wall w of a part such as a suction pipe on an automobile. A glass seal 34 is formed around the sensor. The distal end of the pressure sensor S where the diaphragm 5 is located, is inserted into an atmosphere of a pressure to be measured. The distal end portion is protected by a surrounding mesh screen 35 secured to the lower end of the male thread 31. The mesh screen 35 protects the diaphragm 5 of the pressure sensor S against destructive and violent contact with external movable parts or bodies.

A silicone resin 36 serving as a protective insulator for the conductive terminals 10b (or 13b) is injected into an extension pipe 32 extending from the threaded pipe 30, and a metal cover 37 is fitted over the extension pipe 32, in order to protect the upper end of the pressure sensor S. A lead wire 38 is drawn from the top of the metal cover 37 to allow the necessary conductor wires ; to be connected to the conductive terminals 10b (or 13b).

In the arrangement shown in FIG. 8, a ceramic holder 43 having a bottom portion and a mounting flange 41 for fixing the pressure sensor S to the wall w, is fitted into a bore of a capped pipe 40. The pressure sensor S is inserted into the holder 43 with a glass seal 44 around the sensor. The distal end of the pressure sensor S where the diaphragm 5 is located, projects downward to be protected by a surrounding mesh screen 45 secured to the lower end of the pipe 40.

A silicone resin 46 serving as a protective insulator for the conductive terminals 10b (or 13b) is injected into the ceramic holder 43, and a metal cover 47 is fitted over the pipe 40 with the lower portion of the metal cover 47 being clamped, are provided to protect the upper end portion of the pressure sensor S. A lead wire 48 is drawn from the top of both the pipe 40 and the metal cover 47 for allowing the necessary conductor wires 1 to be connected to the conductive terminals 10b (or 13b).

The major advantage of the arrangement shown in FIG. 8 is that the mounting flange 41 permits the sensor to be fixed to the wall without causing any troubles such as torsion on the lead wire 48 caused when the sensor is threaded directly into the wall.

In the arrangement shown in FIG. 9, the pressure sensor S is inserted into a threaded pipe 50 having a male thread 51 for threading the pipe 50 into the wall w, and having a housing 52 on top. A glass seal 54 may be provided around the sensor. The distal end of the pressure sensor S, where the diaphragm 5 is located, projects downward to be protected by a surrounding mesh screen 55 secured to the lower end of the pipe 50.

A silicone resin 56 that works as a protective insulator for the conductive terminals 10b (or 13b) is injected into the threaded pipe 50, and conductor paths on a circuit board 57 provided within the housing portion 52 of the threaded pipe 50 are connected to conductive terminals 10b (or 13b), in order to protect the upper end of the pressure sensor S. The conductor wires 1 are insulated by a silicone rubber layer 58 placed under the circuit board 57. Further, a metal cover 60 is fitted over the housing portion 52 and has a silicone oil 59 filled in the space between the metal cover and the circuit board 57, and a lead wire 61 connected to the conductor paths on the circuit board 57, is drawn from the top of the metal cover 60 via a rubber packing 62.

As described above, the lead wire 61 is connected to the circuit board 57 in the arrangement shown in FIG. 9. Thus, the positions where the conductor paths are connected to the lead wire 61 can be freely determined by appropriately forming the conductor paths on the circuit board 57. Therefore, the pressure sensor S can be mounted in a way most appropriate for the environment in which it is to be used.

If pressure detection is to be performed with a sensor using a strain resistor, the sensor may be adapted to effect temperature compensation with a thermistor printed on the ceramic layer where the diaphragm is not provided. Further, in order to reduce the possible variations in the resistance value of the strain resistor itself, another resistor may be formed on conductor paths 13a and subsequently trimmed.

In the examples of the sensor mounting mechanism described above, the pressure sensor S is retained by a glass seal so that it has high heat resistance and can be used satisfactorily to measure the pressure of gases as hot as 200° C., and above.

The pressure sensor of the present invention has been described on the foregoing pages with particular reference to the type which, when subjected to an external pressure, experiences diaphragm deformation thereby enabling the pressure to be measured in accordance with the amount of the deformation that occurs. The sensor is also applicable for the purpose of detecting vibrations or acceleration on the basis of diaphragm deformation caused by the stress of such vibrations or acceleration. The sensor can also be used as a liquid pressure sensor for detecting the pressure of a fluid or as a liquid level sensor.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A pressure sensor comprising:
    at least two ceramic layers formed as elongated sheets and bonded together with a gap therebetween at one end so as to form a diaphragm of a portion of one of the ceramic layers that faces said gap and that receives on an outer surface thereof the pressure to be measured;

a pressure-sensitive electrode portion from which an electric output corresponding with the pressure to be measured is generated on the basis of the amount of strain of the diaphragm that develops under the pressure to be measured, said pressure-sensitive electrode portion being provided on or around the diaphragm; and a plurality of conductor paths that are connected to said pressure-sensitive electrode portion and that extend along the length of the ceramic layers, the conductor paths having terminals at the other end of the bonded ceramic layers for connection to an external electric circuit.

2. The pressure sensor according to claim 1, wherein said at least two ceramic layers are sintered together with a combustible material inserted therebetween so that said material may be burned away to create said gap.

3. The pressure sensor according to claim 1, wherein said two ceramic layers are sintered together with a spacer inserted therebetween, said spacer being formed of a ceramic sheet having an opening therethrough which forms said gap.

4. The pressure sensor according to claim 1, wherein said at least two ceramic layers are formed of materials which shrink by different degrees upon sintering, and wherein said at least two ceramic layers are sintered to become bonded together with the exception of a non-bonding area which is provided in an end portion of the bonded ceramic layers, whereby said gap is created in said non-bonding area on account of the difference in shrinkage between said at least two ceramic layers.

5. A pressure sensor comprising:

a cylindrical ceramic layer;

a ceramic layer provided around the circumference of said cylindrical ceramic layer with a circumferential gap formed between said ceramic layer and said cylindrical ceramic layer at one end so as to form a diaphragm of a portion of said ceramic layer that faces said gap;

a pressure-sensitive electrode portion from which an electric output corresponding to the pressure to be measured is generated on the basis of the amount of strain of the diaphragm that develops under the pressure to be measured, said pressure-sensitive electrode portion being provided on or around the diaphragm; and a plurality of conductor paths that are connected to said pressure-sensitive electrode portion and that extend along the length of said ceramic layer and said cylindrical ceramic layer, the conductor paths having terminals at the other end of the bonded ceramic layer and cylindrical layer for connection to an external electric circuit.

6. The pressure sensor according to claim 5, wherein said ceramic layer and said cylindrical ceramic layer are sintered together with a combustible material inserted therebetween so that said material may be burned away to create said gap.

7. The pressure sensor according to claim 5, wherein said ceramic layer and said cylindrical ceramic layer are sintered together with a spacer inserted therebetween, said spacer being formed of a ceramic sheet having an opening therethrough which forms said gap.

8. The pressure sensor according to claim 5, wherein said ceramic layer and said cylindrical ceramic layer are formed of materials which shrink by different degrees upon sintering, and wherein said ceramic layer and said cylindrical ceramic layer are sintered to become bonded together with the exception of a non-bonding area provided in an end portion of the bonded ceramic layer and cylindrical ceramic layer, whereby said gap is created in said non-bonding area on account of the difference in shrinkage between said ceramic layer and said cylindrical ceramic layer.

* * * * *